US008119717B2

(12) United States Patent
Anchor et al.

(10) Patent No.: US 8,119,717 B2
(45) Date of Patent: Feb. 21, 2012

(54) COATING COMPOSITION HAVING A LOW VOLATILE ORGANIC COMPOUND CONTENT

(75) Inventors: Michael J. Anchor, Canton, MI (US); Gregory W. Drewno, Riverview, MI (US)

(73) Assignee: BASF Corporation, Florham Park, NJ (US)

( * ) Notice: Subject to any disclaimer, the term of this patent is extended or adjusted under 35 U.S.C. 154(b) by 528 days.

(21) Appl. No.: 11/562,044

(22) Filed: Nov. 21, 2006

(65) Prior Publication Data
US 2008/0119600 A1    May 22, 2008

(51) Int. Cl.
C08K 3/26 (2006.01)
C09D 17/00 (2006.01)
C09D 1/00 (2006.01)

(52) U.S. Cl. ........ 524/425; 524/379; 524/445; 524/431; 524/432; 524/451; 524/556

(58) Field of Classification Search .................. 524/379, 524/425, 431, 445, 451, 432, 556
See application file for complete search history.

(56) References Cited

U.S. PATENT DOCUMENTS

| | | | |
|---|---|---|---|
| 3,956,401 A | 5/1976 | Scardera et al. | |
| 4,925,587 A | 5/1990 | Schenker et al. | |
| 5,612,305 A | 3/1997 | Lewis | |
| 5,780,555 A * | 7/1998 | Corley et al. ................. | 525/407 |
| 5,877,245 A | 3/1999 | Wiggins et al. | |
| 6,194,513 B1 * | 2/2001 | Sagiv ........................... | 524/832 |
| 6,362,259 B1 | 3/2002 | Natale et al. | |
| 6,387,962 B1 | 5/2002 | Wiggins et al. | |
| 6,489,382 B1 | 12/2002 | Giesecke et al. | |
| 6,582,505 B1 | 6/2003 | Bouvy et al. | |
| 6,583,185 B2 | 6/2003 | Wiggins et al. | |
| 6,686,330 B2 | 2/2004 | Jordan, IV et al. | |
| 2002/0058601 A1 | 5/2002 | Jordan, IV et al. | |
| 2002/0151603 A1 | 10/2002 | Wiggins et al. | |
| 2003/0144397 A1* | 7/2003 | Bouvy et al. ................. | 524/366 |
| 2004/0138075 A1 | 7/2004 | Brown et al. | |
| 2004/0209983 A1 | 10/2004 | Ruggiero et al. | |
| 2006/0241230 A1* | 10/2006 | Porzio et al. ................. | 524/425 |
| 2007/0243254 A1 | 10/2007 | Edgren et al. | |
| 2008/0188603 A1 | 8/2008 | Porzio et al. | |
| 2009/0124740 A1 | 5/2009 | Anchor | |

FOREIGN PATENT DOCUMENTS

| | | | |
|---|---|---|---|
| DE | 10022371 A1 | | 11/2000 |
| WO | WO94/11330 | * | 5/1994 |
| WO | WO 9820960 A1 | | 5/1998 |
| WO | W02004090005 A1 | | 10/2004 |
| WO | WO 2007005470 A2 | | 1/2007 |
| WO | W02007025722 A2 | | 3/2007 |
| WO | WO 2007112505 A1 | | 10/2007 |
| WO | WO 2007141115 A2 | | 12/2007 |
| WO | WO 2008003470 A1 | | 1/2008 |
| WO | WO 2008048592 A2 | | 4/2008 |

OTHER PUBLICATIONS

Union Carbide Corporation, 1996 pp. 1-3.*
PCT International Search Report for PCT/US2007/082949, Apr. 21, 2008, 5 pages.
English language abstract for WO 2007/025722.
Technical bulletin BASF "Surfactants and polyalkylene glycols", Jan. 2005, BASF Aktiengesellschaft Performance Chemicals for Detergents and Formulators, Germany.
Technical bulletin BASF "Lutensol XP(R) Surfactants", Sep. 2005, BASF Corporation, New Jersey.
Technical bulletin BASF "Lutensol(R) XL Surfactants", Sep. 2005, BASF Corporation, New Jersey.
English langauge abstract for DE 10022371 extracted from espacenet.com database, dated Feb. 20, 2009.
English language abstract for WO 2007141115 extracted from espacenet.com database, dated Feb. 20, 2009.
English langauge abstract for WO 2008003470 extracted from espacenet.com database, dated Feb. 20, 2009.
Product Data Sheet for Tergitol 15-S-40 Surfactant, downloaded from http://www.dow.com/surfactants/products/second.htm on Mar. 31, 2010.
Product Data Sheet for Tergitol NP-9 Surfactant, downloaded from http://www.dow.com/surfactants/products/second. htm on Mar. 31, 2010.
"Method 24—Determination of Volatile Matter Content, Water Content, Density, Volume Solids, and Weight Solids of Surface Coatings", downloaded from http://www.epa.gov/ttn/emc/promgate/m-24, pp. 1180-1194.

* cited by examiner

Primary Examiner — James J Seidleck
Assistant Examiner — Deve E Valdez
(74) Attorney, Agent, or Firm — Howard & Howard Attorneys PLLC

(57) ABSTRACT

A coating composition includes a latex component and an agent for replacing all or part of the volatile coalescing solvent. The agent has the following formula:

$$X(AO)_nH$$

wherein
X is a $C_6$ to $C_{16}$ group selected from the group of linear, chains, branched chains, aromatic rings, and combinations thereof,
AO is an alkyleneoxy group selected from the group of ethyleneoxy groups, 1,2-propyleneoxy groups, 1,2-butyleneoxy groups, and combinations thereof, and
n is from 3 to 14.
The coating composition has a VOC content of less than or equal to 150 g/L. The agent for replacing the volatile coalescing solvent contributes little or nothing to a total VOC level in the coating composition. As such, the coating composition may be formulated to have a VOC content of less than or equal to 150 g/L, which meets or exceeds standards for VOC content in interior and exterior flat and non-flat paints for all sheen ranges, while providing equivalent or superior properties to those provided by volatile coalescing solvents.

21 Claims, No Drawings

COATING COMPOSITION HAVING A LOW VOLATILE ORGANIC COMPOUND CONTENT

BACKGROUND OF THE INVENTION

1. Field of the Invention

The subject application generally relates to a coating composition. More specifically, the subject invention relates to a coating composition having a low volatile organic compound content.

2. Description of the Prior Art

Coating compositions are well known in the art for various applications, especially in the construction industry for decorative and protective uses. Many coating composition used in the construction industry include a latex component and are commonly referred to as "latex-based" paints. The coating compositions including the acrylic latex component are formulated with additional components in order to promote or hinder certain properties. For example, coalescing solvents are typically used as a key component of the coating compositions. The function of coalescing solvents in the coating compositions including the latex component is to aid in the coalescence of latex particles into a cohesive film by partitioning to the latex component. As a result, the coalescing solvents impart film-formation properties to the coating composition as the coating composition cures. More specifically, the coalescing solvents function to reduce a film-forming temperature of the coating composition and enable the coating composition to coalesce at low temperatures. Further, the coalescing solvents function to elasticize the coating composition after curing, thereby imparting integrity and resiliency to the coating composition after curing as measured by wet scrub resistance. Optimized and complete coalescence is also necessary to enable the coating composition to resist blocking after curing, i.e., the ability of the coating composition to resist sticking to another surface after curing and to resist any change in appearance when it is pressed against that surface for a prolonged period of time. Absent the coalescing solvents, certain coating composition(s) would have insufficient coalescence, leading to incomplete film formation at low temperatures and therefore poor film integrity, and wet scrub resistance, each of which is required in order for the coating composition to be suitable for many coating applications.

Conventional coalescing solvents that are used in the coating compositions, such as Texanol®, which is 2,2,2-trimethyl-1,3-pentanediol monoisobutyrate, and Dowanol® DPnB, which is dipropylene glycol N-butyl ether, are categorized as volatile organic compounds (VOCs). It has been speculated that the volatile coalescing solvents may contribute to the depletion of the ozone layer. For this reason, the use and content of VOCs in coating compositions are subject to regulation in the State of California by the SCAQMD, South Coast Air Quality Management District, as well as other agencies around the globe. Due to the concerns surrounding VOCs, the SCAQMD has placed mandates on manufacturers of coating compositions to reduce VOC content in the coating compositions of non-flat coatings from 150 g/l to 50 g/l, effective Jul. 1, 2006 and flat textured from 100 g/l to 50 g/l VOC effective Jul. 1, 2008. As a result of the California regulations, formulators throughout the U.S. are developing low VOC coatings having less than 150 g/l VOC. Furthermore, associated coating industries, such as the adhesive and the ink segments are also developing low VOC formulations. As a result of the increasingly stringent regulation of VOCs in the coating compositions, manufacturers of the coating compositions have embarked on a quest to develop low VOC or VOC-free coating compositions while maintaining the physical properties that are obtained when the volatile coalescing solvents are used.

In addition to the coalescing solvents, freeze/thaw additives are also included in the coating compositions to improve freeze/thaw performance of the coating compositions. Conventional freeze/thaw additives that are used in conjunction with the volatile coalescing solvents include ethylene glycol (EG), diethylene glycol (DEG), and propylene glycol (PG). The conventional freeze/thaw additives, like the volatile coalescing solvents, are also VOCs as determined by the U.S. EPA and add to the total VOC content in the coating compositions. As such, there is also a drive to replace the volatile freeze/thaw additives with low or non-volatile freeze/thaw additives; however, suitable low or non-volatile freeze/thaw additives that are effective when used with the volatile coalescing solvents have yet to be identified.

Among the wide variety of various additives that are known for use in coating compositions, alcohol alkoxylates are one category of additives that have found use in the coating compositions. Alcohol alkoxylates cover a broad spectrum of agents that perform various functions, such as defoaming, wetting, dispersing, and acting as a surfactant. An example of one type of alcohol alkoxylate has the following formula:

$$X(AO)_nH$$

wherein X is selected from the group of linear carbon chains, branched carbon chains, aromatic rings, and combinations thereof, AO is an alkyleneoxy group selected from the group of ethyleneoxy groups, 1,2-propyleneoxy groups, 1,2-butyleneoxy groups, and combinations thereof, and n is from to 1 to 75. Such alcohol alkoxylates, when included in the coating compositions, are present for any of the functions as described above, but the coalescing solvents and freeze/thaw additives are also present in the coating composition. In other words, there has been no recognition of specific alcohol alkoxylates as suitable replacements for volatile coalescing solvents in the coating composition.

Alcohol alkoxylates have been suggested for including in coating compositions for the purpose of reducing the content of other components that are characterized as VOCs. For example, U.S. patent application Ser. No. 10/840,917 (the '917 application) to Ruggiero discloses a specific type of alcohol alkoxylate that may be used in a two-component solvent-based paint as a replacement of conventional VOCs that are used in the paint to provide gloss and soft feel to the paint after drying. More specifically, the alcohol alkoxylates are used as surfactants to influence flow characteristics of the paint during application of the paint to a substrate and to aid in leveling of the paint on the substrate as it is applied, which results in the desired gloss and soft feel.

Although enhanced gloss and soft feel are important for certain applications, the specific alcohol alkoxylates disclosed as suitable in the '917 application are not suitable replacements for volatile coalescing solvents. For example, the '917 application lists "POLY-TERGENT" SLF series alcohol alkoxylates as suitable alcohol alkoxylates. Referring to the Examples section below and, specifically, to the Comparative Examples that include Agent L in place of the coalescing solvent, which is an equivalent of POLY-TERGENT SLF-18, those coating compositions have insufficient low temperature coalescence to be a suitable replacement for coalescing solvents in coating compositions. Further, there is no recognition in the '917 patent that certain alcohol alkoxylates may be suitable replacements for volatile coalescing solvents or that the physical properties obtained by using volatile coalescing solvents can also be obtained by using any of the alcohol alkoxylates disclosed therein.

Due to the deficiencies of the prior art, and the strong demand for reducing VOCs in coating compositions without sacrificing physical properties, there is an opportunity to provide a coating composition including an alcohol alkoxylate as a replacement for volatile coalescing solvents in the coating composition such that the VOC content in the coating composition is less than or equal to 150 g/L without sacrificing physical properties of the coating composition.

SUMMARY OF THE INVENTION AND ADVANTAGES

The subject invention provides a coating composition including a latex component and an agent for replacing all or part of the volatile coalescing solvent. The agent has the following formula:

$$X(AO)_nH$$

wherein

X is a $C_6$ to $C_{16}$ group selected from the group of linear chains, branched chains, aromatic rings, and combinations thereof, AO is an alkyleneoxy group selected from the group of ethyleneoxy groups, 1,2-propyleneoxy groups, 1,2-butyleneoxy groups, and combinations thereof, and n is from 3 to 14.

The coating composition has a volatile organic compound content of less than or equal to 150 g/L.

The agent for replacing the volatile coalescing solvent contributes little or nothing to a total VOC level in the coating composition. As such, the coating composition may be formulated to have a VOC content of less than or equal to 150 g/L, while providing equivalent or superior properties to those provided by volatile coalescent solvents across all sheen levels and application areas eg. interior and/or exterior flat—gloss paints. Even more, with some of the agents for replacing the volatile coalescing solvents, conventional freeze/thaw additives may be replaced with low or non-volatile freeze/thaw additives. In some cases, the conventional freeze/thaw additives may even be completely eliminated from the coating composition, while obtaining the same freeze/thaw performance as with the volatile freeze/thaw additives. As a result, the VOC content of the coating composition may be even further reduced. In some cases, a synergistic effect may even be obtained with the combination of specific agents for replacing the volatile coalescing solvent and specific freeze/thaw additives.

DETAILED DESCRIPTION OF THE INVENTION

A coating composition is provided that is commonly used as an interior or exterior flat paint in the construction industry for decorative and protective purposes. The coating composition has a low volatile organic compound (VOC) content of less than or equal to 150 g/L, typically less than or equal to 50 g/l, which meets or exceeds standards for VOC content in interior and exterior flat and non-flat paints for all sheen ranges while providing equivalent or superior properties to those provided by volatile coalescing solvents. VOCs, as defined herein, are organic chemical compounds that have high enough vapour pressures under normal conditions to significantly vaporize and enter the atmosphere and that are characterized as such by the United States Environmental Protection Agency through testing in accordance with EPA Method 24. The low VOC content is obtained while exhibiting low temperature coalescence at 40° F. over a period of 18 hours, exhibiting blocking resistance in accordance with a modified version of ASTM D4946-89, and having a wet scrub resistance of at least 400 cycles as measured in accordance with a modified version of ASTM D2486. The physical properties of the coating composition are described in further detail below. Such physical properties are typically achieved only by using volatile coalescing solvents in the coating composition.

The coating composition includes a latex component and may be referred to as "latex-based" paint. The latex component is typically in the form of discrete solid polymeric particles formed by the polymerization of at least one ethylenically-unsaturated monomer in an aqueous dispersion medium. The polymeric particles are typically formed by emulsion polymerization in accordance with known technology.

Representative polymeric particles that are suitable for the coating composition include styrene-butadiene polymers, acrylic polymers, vinyl acetate polymers, vinyl chloride polymers, and combinations thereof. Particularly suitable polymeric particles include styrene-butadiene polymeric particles that are composed of from about 40 to about 70 parts by weight, more typically from about 45 to about 65 parts by weight, based on 100 parts by weight of the polymeric particles. The styrene-butadiene polymeric particles may be formed from carboxylated styrene-butadiene polymers. Suitable acrylic polymers include copolymers of acrylonitrile, acrylic acid, methacrylic acid, butylacrylic acid, styrene, and combinations thereof. The polymeric particles typically have a number average particle size of from about 0.05 to about 3 microns, and preferably a number average particle size of approximately 0.1 to 0.5 micron. However, it is to be appreciated that solid polymeric particles that are outside of the above ranges may also be suitable for purposes of the present invention.

For the coating composition of the present invention, polymeric particles are typically selected which possess an ability to form a firm, relatively non-tacky layer upon curing of the coating composition in accordance with known technology.

In order to obtain the coating composition having the low VOC content while exhibiting the physical properties briefly described above, the coating composition includes an agent for replacing volatile coalescing solvent that has been included in coating compositions in the past in order to obtain those physical properties. The agent contributes little or nothing to the VOC content of the coating composition. The agent has the following formula:

$$X(AO)_nH$$

wherein

X is a $C_6$ to $C_{16}$ group selected from the group of linear chains, branched chains, aromatic rings, and combinations thereof, AO is an alkyleneoxy group selected from the group of ethyleneoxy groups, 1,2-propyleneoxy groups, 1,2-butyleneoxy groups, and combinations thereof, and n is from 3 to 14.

Agents represented by the above formula are known in the art and can be formed in accordance with techniques that are known in the art, such as through the addition of alkylene oxide to an aliphatic monohydric alcohol, phenol, or glycol having from 6 to 14 carbon atoms. Representative aliphatic monohydric alcohols include, but are not limited to, octyl alcohol, nonyl alcohol, decyl alcohol, dodecyl alcohol (i.e., lauryl alcohol), tridecyl alcohol, and tetradecyl alcohol, and combinations thereof. Such alcohols may be provided as mixtures of primarily branched-chain molecules. Representative phenols include, but are not limited to, octyl phenol. The agents typically have a number average molecular weight of from 250 to 4000 g/mol, more typically from 250 to 1750 g/mol, most typically from 250 to 400 g/mol in order to be deemed low or non-volatile in accordance with EPA Method 24.

The agents of the present invention represent a group of alcohol alkoxylates that are all suitable for replacing the volatile coalescing solvent; however, some of the agents encompassed by the above formula are more effective than others. One specific example of a suitable agent for replacing the volatile coalescing agent is a tridecyl alcohol alkoxylate formed by the reaction of branched-chain tridecyl alcohol and about 3 moles of ethylene oxide for each mole of the tridecyl alcohol, hereinafter referred to as "TDA-3". Another specific example of a suitable agent for replacing the volatile coalescing agent is an octyl phenol alkoxylate formed by the reaction of octyl phenol and about 3 moles of ethylene oxide for each mole of the octyl phenol, hereinafter referred to as "OP-3". In particularly preferred embodiments, the agent for replacing the volatile coalescing solvent is a $C_{10}$-Guerbet alcohol-based alcohol alkoxylate having from 3 to 5 moles of ethylene oxide for each mole of the $C_{10}$-Guerbet alcohol, most preferably about 3 moles of ethylene oxide for each mole of $C_{10}$-Guerbet alcohol. The $C_{10}$-Guerbet alcohol-based alcohol alkoxylate preferably has a number average molecular weight of from 250 to 400 g/mol, most preferably about 290 g/mol. One specific example of a suitable $C_{10}$-Guerbet alcohol-based alcohol alkoxylate is formed by the reaction of $C_{10}$-Guerbet alcohol with about 3 moles of ethylene oxide for each mole of the $C_{10}$-Guerbet alcohol and has a number average molecular weight of about 290 g/mol, hereinafter referred to as "XP-30". Another specific example of a suitable $C_{10}$-Guerbet alcohol-based alcohol alkoxylate is formed by the reaction of $C_{10}$-Guerbet alcohol with about 5 moles of ethylene oxide for each mole of the $C_{10}$-Guerbet alcohol and has a number average molecular weight of about 370 g/mol, hereinafter referred to as "XP-50". The XP-30 and XP-50 are both commercially available from BASF Corporation of Florham Park, N.J. In yet another particularly preferred embodiment, the agent for replacing the volatile coalescing solvent is an alcohol propoxylate such as, for example, 2-propyl heptanol having about 10 moles of propylene oxide and about 1 mole of ethylene oxide. The agents typically have a HLB of from 1 to 9 in order for the agents to partition to the latex component in the coating composition. The agents of the present invention exhibit properties that are between a hydrophobic solvent and a surfactant due to the HLB of from 1 to 9.

In one embodiment, the agents for replacing the volatile coalescing solvent may be included in the coating composition along with a fraction of a full charge of the volatile coalescing solvent, which is typically about 0.6 parts by weight based on 100 parts by weight of the coating composition. In other words, some of the volatile coalescing solvent may be replaced with the agent in order to sufficiently reduce the VOC content of the coating composition to less than or equal to 150 g/L. In a more preferred embodiment, the coating composition is substantially free of volatile coalescing solvents, i.e., the coating composition includes less than 0.05 parts by weight of the volatile coalescing solvent based on 100 parts by weight of the coating composition.

The amount of the agent present in the coating composition is from about 0.15 to about 7.0 parts by weight, more typically from about 0.2 to about 5.0 parts by weight, based on 100 parts by weight of the coating composition. The level of the agent that is present in the coating formulation varies widely and is dependent, in part, on the hardness of the resulting film as designated by the glass transition temperature, Tg, of the latex component. For example, higher amounts of the agent are typically present, within the stated range, when the Tg of the latex component is relatively higher, and lower amounts of the agent are typically present, also within the stated range, when the Tg of the latex component is relatively lower. It is to be appreciated that volatile coalescing solvents, such as Texanol®, may also be present in the coating compositions, albeit in a lesser amount than normal to ensure that the total VOCs remain at or below 150 g/l, especially when the latex components having high Tg are used.

The amount of the agent present in the coating composition further depends upon the specific agent that is used. The agent may effectively replace all of the volatile coalescing agent which, as set forth above, has been traditionally present in an amount of about 0.6 parts by weight based on 100 parts by weight of the coating composition. However, it is also possible to replace only a portion of the volatile coalescing agent to bring the total amount of VOCs in the coating composition within an acceptable range of less than 150 g/l. Thus, a lower amount of the agent may be included in the coating composition than volatile coalescing agent that would otherwise be required to obtain the same physical properties, while lowering the VOC content of the coating composition.

As set forth above, the coating composition of the present invention exhibits low temperature coalescence at 40° F. over a period of 18 hours. Low temperature coalescence is important in order to ensure that the coating composition will sufficiently cure at low temperatures. The low temperature coalescence of the coating composition is directly related to the agent that is used in the coating composition, as illustrated in the Examples below. To test for low temperature coalescence, a draw down of the coating composition is taken and placed in a refrigerator at about 40° F. After 18 hours, the coating composition is removed from the refrigerator and examined through qualitative testing to determine if the coating composition is flaky or discontinuous. Low temperature coalescence is reported as a pass/no pass test.

The coating composition of the present invention also exhibits blocking resistance in accordance with a modified version of ASTM D4946-89. Blocking resistance is the ability of the coating composition to resist sticking to another surface, such as to itself, and to resist any change in appearance when it is pressed against that surface for a prolonged period of time, heated, and cooled to room temperature. Blocking resistance is graded on a scale of 1-10 with 1 being completely sealed and 10 being completely tack free. Blocking is typically measured after 1, 2 and 7 days of curing. In essence, blocking resistance is a measurement of tackiness of the coating composition after cure, with resistance to both sticking and changes in appearance after undergoing compression earning the coating composition a pass. Blocking resistance of the coating composition, like low temperature coalescence, is also a property that can be directly related to the agent that is used in the coating composition, as illustrated in the Examples below.

The coating composition, more specifically the coating composition after curing, also has a wet scrub resistance of at least 400 cycles as measured in accordance with ASTM D2486. Wet scrub resistance is a quantification of integrity and resiliency of the coating composition after curing, with higher cycles to failure indicating higher integrity and resiliency. Wet scrub resistance of the coating composition is also a property that can be directly related to the agent that is used in the coating composition, but typically only until the film is completely coalesced. After coalescence, adding more agent to the coating composition typically does not improve scrub. In a particularly preferred embodiment, in this resin type and formulation, when XP-30 is used as the agent, the wet scrub resistance is at least 650 and may be as high as 845, depending upon the amount of the XP-30 that is present in the coating composition and also depending upon other additives that are present in the coating composition.

In conventional coating compositions, freeze/thaw additives are also included to improve freeze/thaw performance of the coating compositions. Freeze/thaw performance is important for the coating compositions since the coating compositions may be subject to temperature cycling after production but before curing, which may affect the physical properties of the coating composition after curing. The freeze/thaw additives are generally necessary when the volatile coalescing solvents are used. Conventional freeze/thaw additives that are used in conjunction with the volatile coalescing solvents include ethylene glycol (EG), diethylene glycol (DEG), and propylene glycol (PG). The conventional freeze/thaw additives, like the volatile coalescing solvents, are VOCs as determined by the U.S. EPA and add to the VOC content of the coating compositions. The same conventional freeze/thaw additives may be used in the coating composition of the present invention.

Due to the elimination of the volatile coalescing solvents, the VOC content of less than or equal to 150 g/L in the coating composition may be obtained even with the conventional freeze/thaw additives. However, other low or non-volatile freeze/thaw additives may be substituted for the conventional freeze/thaw additives when the agents of the present invention replace the volatile coalescing solvents. A low or non-volatile freeze/thaw additive, as used herein, is one having a volatility of less than or equal to 10% as measured by Method 24. As such, the coating composition of the present invention may be substantially free of the conventional freeze/thaw additives, i.e., the conventional freeze/thaw additives may be present in the coating composition in an amount of less than or equal to 0.01 parts by weight based on 100 parts by weight of the coating composition. However, it is to be appreciated that, depending upon the amount of volatile coalescing solvent that is replaced, greater amounts of the conventional freeze/thaw additives may be used while still maintaining the level of VOCs less than or equal to 150 g/l.

Low or non-volatile freeze/thaw additives that are suitable for purposes of the present invention include polyalkylene glycols such as polyethylene glycol such as Pluracol® E 200, polypropylene glycol such as Pluracol® P410; trimethylolpropane (TMP) alkoxylates; Pluronic® polyols such as Pluronic® F 38; and combinations thereof. Typically, the polyalkylene glycols have a number average molecular weight of at least 132 g/mol, more typically from 200 to 450 g/mol, which makes the polyalkylene glycols non-volatile. More specifically, when polyethylene glycol is used as the low or non-volatile freeze/thaw additive, the polyethylene glycol typically has a number average molecular weight of at least 150 g/mol, more typically about 200 g/mol. Likewise, when the polypropylene glycol is used as the low or non-volatile freeze/thaw additive, the polypropylene glycol typically has a number average molecular weight of at least 200 g/mol, more typically about 410 g/mol.

The level at which conventional (i.e. EG, DEG, PG) and non-conventional (i.e. Pluracol® E 200, Pluracol® P 410, and TMP alkoxylates) freeze/thaw additives are present in the coating composition depends on the type of latex component that is used and the formulation of the coating composition. For example, in a coating composition having 50 g/l VOCs, the agent for replacing the volatile coalescing solvent may be used with one or more of the conventional freeze/thaw additives, such as EG. Therefore, the majority of the VOCs may come from the conventional freeze/thaw additive, and the resulting coating composition may still be formulated to have VOCs present in the amount of less than or equal to 150 g/l. Many options may be available by using the low or non-volatile freeze/thaw additives in combination with the agent for replacing the volatile coalescing solvent. For example, only a portion of the volatile coalescing solvents may need to be replaced, thereby optimizing film properties.

When used, the low or non-volatile freeze/thaw additives are typically present in the coating composition in an amount of at least 0.1 parts by weight, more typically from 0.4 to 5 parts by weight, based on 100 parts by weight of the coating composition. The polyethylene glycol, when used as the low or non-volatile freeze/thaw additive, is typically present in the coating composition in an amount of from about 0.1% to about 5 parts by weight based on 100 parts by weight of the coating composition. The polypropylene glycol, when used as the low or non-volatile freeze/thaw additive, is typically present in the coating composition in an amount of from about 0.4 to about 5 parts by weight based on 100 parts by weight of the coating composition.

In some instances, depending on the formulation and resin type, the coating composition may be completely free of freeze/thaw additives. For example, when the agent is TDA-3, XP-30, XP-50, or OP-3, the freeze/thaw additive may be completely eliminated without affecting freeze/thaw performance of the coating composition. Freeze/thaw performance is typically measured in terms of an ability of the coating composition to exhibit freeze/thaw resistant in accordance with ASTM D2243-95. Freeze/thaw resistance, like low temperature coalescence, is reported as a pass/no pass test. In other instances, a synergistic effect may be observed between certain agents for replacing the volatile coalescing solvents and certain low or non-volatile freeze/thaw additives. For example, when the agent is the alcohol propoxylate, polyethylene glycol is an effective freeze/thaw additive, whereas conventional volatile freeze/thaw additives are ineffective.

In addition to the latex component, the agent for replacing the volatile coalescing solvent, the freeze/thaw additive, and any volatile coalescing solvent that may be present in the coating composition, the coating composition typically includes other additives. The additives may be selected from the group of inorganic and organic pigments, dispersing agents, defoaming agents, wetting agents, adhesion promoters, viscosity modifiers, additives to improve hiding, additives to improve blocking, neutralizing agents, biocides, and combinations thereof. Specific examples of suitable additives include Natrosol Plus, AMP 95, Sokalan®Polymers, Nicron 402, Minex, Pluracoat™ WA, titanium dioxide, Plurafac®S505LF, DrewPlus L 475, to name a few. Such additives are known in the art for including in coating compositions.

EXAMPLES

Various examples of coating compositions are formulated using different agents for replacing volatile coalescing solvents, different amounts of the agents, different types of freeze/thaw additives, and different amounts of the freeze/thaw additives. In addition, the coating compositions may include a neutralizing agent (0.25-1.0% by weight), rheology additives (0.5 to 1.0% by weight), a biocide (0.5 to 1.0% by weight), extenders (20 to 26% by weight), dispersants (1 to 5% by weight), defoamers (0.1 to 0.5% by weight), a $TiO_2$ slurry (about 27.25%), the volatile coalescing solvent (about 0.6%), a straight acrylic polymer (about 60%), etc.

The coating composition typically has the following emulsion properties, as shown in Table 1:

TABLE 1

| PVC | 25-55% |
|---|---|
| pH | 7-9.5 |
| Viscosity, KU | 85-125 |
| Density | 8.5-13 lbs/gal |
| VOC Level | 0-150 g/l |

The following Examples are grouped based on different combinations of amount of the agents, type of freeze/thaw additive, and amount of the freeze/thaw additive. The coating compositions are compared for effectiveness based on the physical properties of low temperature coalescence, blocking resistance, initial wet scrub resistance, final wet scrub resistance, foam height, and freeze/thaw performance. Low temperature coalescence, blocking resistance, initial wet scrub resistance, final wet scrub resistance, and freeze/thaw performance are tested as described above. More specifically, for low temperature coalescence, a draw down of each coating composition is taken and placed in a refrigerator at about 40° F. After 18 hours, the coating composition is removed from the refrigerator and examined through qualitative testing to determine if the coating composition is flaky or discontinuous or if the coating composition has completely cured. Low temperature coalescence is reported as a pass/no pass test, with complete curing earning the coating composition a pass. Blocking resistance of the coating compositions in determined in accordance with a modified version of ASTM D4946-89 as described above, below 6 failed, 6 and above passed. Initial and final wet scrub resistances of the coating compositions after curing are measured in accordance with ASTM D2486, with higher cycles to failure indicating higher integrity and resiliency. Freeze/thaw performance is determined in accordance with ASTM D2243-95 and, like low temperature coalescence, is reported as a pass/no pass test. Foam height is measured by drawing down a 6 mil coating of the test formulation on a coated Leneta sheet. A paint brush is used to uniformly dab the wet drawdown a fixed number if times in a specific area on the Leneta sheet. For consistency, one set at a time it typically tested, including a control. The dabbed coating is allowed to dry. A cardboard cover with a 1.5×1.5 inch area cut out is placed on the test panel. Dried bubbles are counted and recorded as the foam test number.

Examples 1-8

Examples 1-8 are coating compositions formulated testing various agents for replacing commonly used volatile coalescing solvents such as Texanol. The test agents are present in an amount of 0.6 parts by weight based on 100 parts by weight of the coating composition. This test formulation contains ethylene glycol, a conventional freeze/thaw additive, present in an amount of 0.92 parts by weight based on 100 parts by weight of the coating composition. The results for low temperature coalescence, blocking resistance, initial wet scrub resistance (in cycles to failure), final wet scrub resistance (in cycles to failure), foam test (in number of bubbles), and freeze/thaw performance for Examples 1-8 are shown in Table 2 below.

TABLE 2

| Ex. | Agent | Low Temperature Coalescence | Blocking Resistance | Initial Wet Scrub | Final Wet Scrub | Foam Test | Freeze/Thaw Performance |
|---|---|---|---|---|---|---|---|
| 1 | Agent A | Pass | Pass | 610 | 670 | 41 | Pass |
| 2 | Agent B | Pass | Pass | 533 | 585 | 36 | Pass |
| 3 | Agent C | Pass | Pass | 730 | 790 | 29 | Pass |
| 4 | Agent D | Pass | Pass | 560 | 635 | 33 | Pass |
| 5 | Agent E | Pass | Pass | 685 | 737 | 62 | Pass |
| 6 | Agent F | Pass | Pass | 675 | 740 | 50 | Pass |
| 7 | Agent G | Pass | Pass | 520 | 595 | 39 | Pass |
| 8 | Agent H | Pass | Pass | 490 | 545 | 55 | Pass |

Agent A is propoxylated m,p-cresol commercially available from BASF Corporation of Florham Park, N.J.

Agent B is a polyalkylene glycol having comprised of mixture of ethylene oxide and propylene oxide in a ratio such that the product is water insoluble commercially available from BASF Corporation of Florham Park, N.J.

Agent C is an alcohol ethoxylate, commercially available from BASF Corporation of Florham Park, N.J.

Agent D is a di-functional block copolymer based on blocks of ethylene oxide and propylene oxide arranged in a ABA structure where the A blocks are polyethylene oxide, the B block is polypropylene oxide and having primary hydroxyl groups, with a number average molecular weight of about 3800 g/mol, commercially available from BASF Corporation of Florham Park, N.J.

Agent E is a tridecyl alcohol-based alcohol alkoxylate having 3 moles of ethylene oxide for each mole of tridecyl alcohol and having a number average molecular weight of 325 g/mol, commercially available from BASF Corporation of Florham Park, N.J.

Agent F is a $C_{10}$-Guerbet alcohol-based alcohol alkoxylate having 3 moles of ethylene oxide for each mole of the $C_{10}$-Guerbet alcohol and having a number average molecular weight of 290 g/mol, commercially available from BASF Corporation of Florham Park, N.J.

Agent G is a $C_{10}$-Guerbet alcohol-based alcohol alkoxylate having 5 moles of ethylene oxide for each mole of the $C_{10}$-Guerbet alcohol and having a number average molecular weight of 370 g/mol, commercially available from BASF Corporation of Florham Park, N.J.

Agent H is an ethylene oxide adduct of octyl phenol having 3 moles of ethylene oxide for each mole of the octyl phenol and having a number average molecular weight of approximately 347 g/mol, commercially available from BASF Corporation of Florham Park, N.J.

Comparative Examples 1-5

Comparative Examples 1-4 are coating compositions formulated in the same manner as the coating compositions of Examples 1-8, but with agents that cause the coating composition to exhibit insufficient low temperature coalescence or insufficient freeze/thaw performance. Comparative Example 5 is formulated with Texanol®, i.e., a volatile coalescing solvent, as the agent to provide comparative physical property results to the physical properties of the coating compositions of Examples 1-8. The results for low temperature coalescence, blocking resistance, initial wet scrub resistance (in cycles to failure), final wet scrub resistance (in cycles to failure), foam test (in number of bubbles), and freeze/thaw performance for Comparative Examples 1-5 are shown in Table 3 below.

TABLE 3

| Comp Ex. | Agent | Low Temperature Coalescence | Blocking Resistance | Initial Wet Scrub | Final Wet Scrub | Foam Test | Freeze/Thaw Performance |
|---|---|---|---|---|---|---|---|
| 1 | Agent J | — | — | — | — | — | Fail |
| 2 | Agent K | — | — | — | — | — | Fail |
| 3 | Agent L | Fail | — | — | — | — | — |
| 4 | Agent M | Fail | — | — | — | — | — |
| 5 | Agent N | Pass | Pass | 680 | 740 | 46 | Pass |

Agent J is an alcohol propoxylate, commercially available from BASF Corporation of Florham Park, N.J.

Agent K is a mixture of agent A and agent J in a 1:1 weight ratio, commercially available from BASF Corporation of Florham Park, N.J.

Agent L is a alcohol-based alcohol alkoxylate commercially available from BASF Corporation of Florham Park, N.J. under the trade name Plurafac® SLF-18.

Agent M is a is a di-functional block copolymer based on polyethylene oxide and polypropylene oxide arranged in a BAB structure where the A block is polyethylene oxide, the B blocks are polypropylene oxide, and having secondary hydroxyl end groups, with a number average molecular weight of about 3250 g/mol, commercially available from BASF Corporation of Florham Park, N.J.

Agent N is 2,2,2-trimethyl-1,3-pentanediol monoisobutyrate commercially available from Eastman Chemical Company of Kingsport, Tenn.

Examples 9-12

Examples 9-12 are coating compositions formulated using various agents for replacing the volatile coalescing solvents, with agents for replacing the volatile coalescing solvents present in the coating compositions. The agents are present in an amount of 0.2 parts by weight based on 100 parts by weight of the coating composition, with no freeze/thaw additive present whatsoever. The results for low temperature coalescence, blocking resistance, initial wet scrub resistance (in cycles to failure), final wet scrub resistance (in cycles to failure), foam test (in number of bubbles), and freeze/thaw performance for Examples 9-12 are shown in Table 4 below.

TABLE 4

| Ex. | Agent | Low Temperature Coalescence | Blocking Resistance | Initial Wet Scrub | Final Wet Scrub | Foam Test | Freeze/Thaw Performance |
|---|---|---|---|---|---|---|---|
| 9 | Agent E | Pass | Pass | 650 | 780 | 67 | Pass |
| 10 | Agent F | Pass | Pass | 775 | 825 | 48 | Pass |
| 11 | Agent G | Pass | Pass | 590 | 685 | 35 | Pass |
| 12 | Agent H | Pass | Pass | 510 | 540 | 55 | Pass |

Comparative Examples 6-14

Comparative Examples 6-13 are coating compositions formulated in the same manner as the coating compositions of Examples 9-12, but with agents that cause the coating composition to exhibit insufficient low temperature coalescence. Comparative Example 14 is formulated with Texanol®, a volatile coalescing solvent. All agents are in the formulation in an amount of 0.6 parts by weight based on 100 parts by weight of the coating composition. This provides comparative physical property results to the physical properties of the coating compositions of Examples 9-12. The results for low temperature coalescence, blocking resistance, initial wet scrub resistance (in cycles to failure), final wet scrub resistance (in cycles to failure), foam test (in number of bubbles), and freeze/thaw performance for Comparative Examples 6-14 are shown in Table 5 below.

TABLE 5

| Comp Ex. | Agent | Low Temperature Coalescence | Blocking Resistance | Initial Wet Scrub | Final Wet Scrub | Foam Test | Freeze/Thaw Performance |
|---|---|---|---|---|---|---|---|
| 6 | Agent A | Fail | — | — | — | — | — |
| 7 | Agent J | Fail | — | — | — | — | — |
| 8 | Agent K | Fail | — | — | — | — | — |
| 9 | Agent B | Fail | — | — | — | — | — |
| 10 | Agent C | Fail | — | — | — | — | — |
| 11 | Agent D | Fail | — | — | — | — | — |
| 12 | Agent L | Fail | — | — | — | — | — |
| 13 | Agent M | Fail | — | — | — | — | — |
| 14 | Agent N | Pass | Pass | 678 | 735 | 46 | Pass |

Examples 13-17

Examples 13-17 are coating compositions formulated using various agents for replacing the volatile coalescing solvents, with no volatile coalescing solvents present in the coating compositions. The agents are present in an amount of 0.6 parts by weight based on 100 parts by weight of the coating composition, with polyethylene glycol having a number average molecular weight of about 200 g/mol substituted for the conventional freeze/thaw additive. The polyethylene glycol is present in an amount of 0.92 parts by weight based on 100 parts by weight of the coating compositions. The results for low temperature coalescence, blocking resistance, initial wet scrub resistance (in cycles to failure), final wet scrub resistance (in cycles to failure), foam test (in number of bubbles), and freeze/thaw performance for Examples 13-17 are shown in Table 6 below.

TABLE 6

| Ex. | Agent | Low Temperature Coalescence | Blocking Resistance | Initial Wet Scrub | Final Wet Scrub | Foam Test | Freeze/Thaw Performance |
|---|---|---|---|---|---|---|---|
| 13 | Agent J | Pass | Pass | 560 | 635 | 31 | Pass |
| 14 | Agent E | Pass | Pass | 560 | 610 | 32 | Pass |
| 15 | Agent F | Pass | Pass | 810 | 845 | 58 | Pass |
| 16 | Agent G | Pass | Pass | 445 | 560 | 47 | Pass |
| 17 | Agent H | Pass | Pass | 535 | 580 | 20 | Pass |

Comparative Examples 15-22

Comparative Examples 15-21 are coating compositions formulated in the same manner as the coating compositions of Examples 13-17, but with agents that cause the coating composition to exhibit insufficient low temperature coalescence or insufficient freeze/thaw performance. Comparative Example 22 is formulated with Texanol®, i.e., a volatile coalescing solvent, as the agent in an amount of 0.6 parts by weight of based on 100 parts by weight of the coating composition and ethylene glycol, i.e., a volatile freeze/thaw additive, in an amount of 0.92 parts by weight based on 100 parts by weight of the coating composition to provide comparative physical property results to the physical properties of the coating compositions of Examples 13-17. The results for low temperature coalescence, blocking resistance, initial wet scrub resistance (in cycles to failure), final wet scrub resistance (in cycles to failure), foam test (in number of bubbles), and freeze/thaw performance for Comparative Examples 15-22 are shown in Table 7 below.

TABLE 7

| Comp Ex. | Agent | Low Temperature Coalescence | Blocking Resistance | Initial Wet Scrub | Final Wet Scrub | Foam Test | Freeze/Thaw Performance |
|---|---|---|---|---|---|---|---|
| 15 | Agent A | Fail | — | — | — | — | — |
| 16 | Agent K | — | — | — | — | — | Fail |
| 17 | Agent B | Fail | — | — | — | — | — |
| 18 | Agent C | Fail | — | — | — | — | — |
| 19 | Agent D | Fail | — | — | — | — | — |
| 20 | Agent L | Fail | — | — | — | — | — |
| 21 | Agent M | Fail | — | — | — | — | — |
| 22 | Agent N | Pass | Pass | 710 | 755 | 46 | Pass |

Examples 18-20

Examples 18-20 are coating compositions formulated using various agents for replacing the volatile coalescing solvents, with no volatile coalescing solvents present in the coating compositions. The agents are present in an amount of 0.6 parts by weight based on 100 parts by weight of the coating composition, with polyethylene glycol having a number average molecular weight of about 200 g/mol substituted for the conventional freeze/thaw additive. The polyethylene glycol is present in an amount of 0.46 parts by weight based on 100 parts by weight of the coating compositions. The results for low temperature coalescence, blocking resistance, initial wet scrub resistance (in cycles to failure), final wet scrub resistance (in cycles to failure), foam test (in number of bubbles), and freeze/thaw performance for Examples 18-20 are shown in Table 8 below.

TABLE 8

| Ex. | Agent | Low Temperature Coalescence | Blocking Resistance | Initial Wet Scrub | Final Wet Scrub | Foam Test | Freeze/Thaw Performance |
|---|---|---|---|---|---|---|---|
| 18 | Agent E | Pass | Pass | 703 | 785 | 41 | Pass |
| 19 | Agent F | Pass | Pass | 505 | 570 | 32 | Pass |
| 20 | Agent G | Pass | Pass | 462 | 510 | 25 | Pass |

Comparative Examples 23-32

Comparative Examples 23-31 are coating compositions formulated in the same manner as the coating compositions of Examples 18-20, but with agents that cause the coating composition to exhibit insufficient low temperature coalescence. Comparative Example 32 is formulated with Texanol®, i.e., a volatile coalescing solvent, as the agent in an amount of 0.6 parts by weight of based on 100 parts by weight of the coating composition with polyethylene glycol having a number average molecular weight of about 200 g/mol substituted for the conventional freeze/thaw additive. The polyethylene glycol is present in an amount of 0.46 parts by weight based on 100 parts by weight of the coating compositions. The results for low temperature coalescence, blocking resistance, initial wet scrub resistance (in cycles to failure), final wet scrub resistance (in cycles to failure), foam test (in number of bubbles), and freeze/thaw performance for Comparative Examples 23-32 are shown in Table 9 below.

TABLE 9

| Comp Ex. | Agent | Low Temperature Coalescence | Blocking Resistance | Initial Wet Scrub | Final Wet Scrub | Foam Test | Freeze/Thaw Performance |
|---|---|---|---|---|---|---|---|
| 23 | Agent A | Fail | — | — | — | — | — |
| 24 | Agent J | Fail | — | — | — | — | — |
| 25 | Agent K | Fail | — | — | — | — | — |
| 26 | Agent B | Fail | — | — | — | — | — |
| 27 | Agent C | Fail | — | — | — | — | — |
| 28 | Agent D | Fail | — | — | — | — | — |
| 29 | Agent L | Fail | — | — | — | — | — |
| 30 | Agent M | Fail | — | — | — | — | — |
| 31 | Agent E | Fail | — | — | — | — | — |
| 32 | Agent N | Pass | Pass | 680 | 740 | 46 | Pass |

Examples 21-28

Examples 21-28 are coating compositions formulated using various agents for replacing the volatile coalescing solvents, with no volatile coalescing solvents present in the coating compositions. The agents are present in an amount of 0.6 parts by weight based on 100 parts by weight of the coating composition, with polypropylene glycol having a number average molecular weight of about 410 g/mol substituted for the conventional freeze/thaw additive. The polypropylene glycol is present in an amount of 0.46 parts by weight based on 100 parts by weight of the coating compositions. The results for low temperature coalescence, blocking resistance, initial wet scrub resistance (in cycles to failure), final wet scrub resistance (in cycles to failure), foam test (in number of bubbles), and freeze/thaw performance for Examples 21-28 are shown in Table 10 below.

TABLE 10

| Ex. | Agent | Low Temperature Coalescence | Blocking Resistance | Initial Wet Scrub | Final Wet Scrub | Foam Test | Freeze/Thaw Performance |
|---|---|---|---|---|---|---|---|
| 21 | Agent A | Pass | Pass | 580 | 648 | 35 | Pass |
| 22 | Agent B | Pass | Pass | 650 | 760 | 30 | Pass |
| 23 | Agent C | Pass | Pass | 720 | 790 | 23 | Pass |
| 24 | Agent D | Pass | Pass | 510 | 545 | 38 | Pass |
| 25 | Agent E | Pass | Pass | 622 | 730 | 57 | Pass |
| 26 | Agent F | Pass | Pass | 710 | 820 | 44 | Pass |
| 27 | Agent G | Pass | Pass | 430 | 515 | 34 | Pass |
| 28 | Agent H | Pass | Pass | 472 | 520 | 64 | Pass |

Comparative Examples 33-37

Comparative Examples 33-36 are coating compositions formulated in the same manner as the coating compositions of Examples 21-28, but with agents that cause the coating composition to exhibit insufficient low temperature coalescence. Comparative Example 37 is formulated with Texanol®, i.e., a volatile coalescing solvent, as the agent in an amount of 0.6 parts by weight of based on 100 parts by weight of the coating composition with polypropylene glycol having a number average molecular weight of about 410 g/mol substituted for the conventional freeze/thaw additive. The polypropylene glycol is present in an amount of 0.46 parts by weight based on 100 parts by weight of the coating compositions. The results for low temperature coalescence, blocking resistance, initial wet scrub resistance (in cycles to failure), final wet scrub resistance (in cycles to failure), foam test (in number of bubbles), and freeze/thaw performance for Comparative Examples 33-37 are shown in Table 11 below.

TABLE 11

| Comp Ex. | Agent | Low Temperature Coalescence | Blocking Resistance | Initial Wet Scrub | Final Wet Scrub | Foam Test | Freeze/Thaw Performance |
|---|---|---|---|---|---|---|---|
| 33 | Agent J | — | — | — | — | — | Fail |
| 34 | Agent K | — | — | — | — | — | Fail |
| 35 | Agent L | Fail | — | — | — | — | — |
| 36 | Agent M | Fail | — | — | — | — | — |
| 37 | Agent N | Pass | Pass | 710 | 755 | 46 | Pass |

Results

As is apparent from studying the above Examples in comparison to the Comparative Examples, various combinations of agents for replacing coalescing solvents produce result in suitable physical properties of the coating composition, in the absence of the volatile coalescing solvents and, in Examples 9-12, in the absence of any freeze/thaw agent whatsoever. Each of the Examples of the present invention illustrate suitable low temperature coalescence, blocking resistance, and freeze/thaw performance. It is particularly notable that when Agent F, which is Lutensol® XP-30 as described above in the specification, is included as the agent for replacing the volatile coalescing solvent, initial wet scrub and final wet scrub results indicate even greater cycles to failure, as compared to when the volatile coalescing solvents are included. As such, Agent F enables to the coating composition to exhibit higher integrity and resiliency than coating compositions including the volatile freeze/thaw additives, in addition to providing suitable low temperature coalescence, blocking resistance, and freeze/thaw performance. Further, it is apparent that synergistic results are observed when the agent is the alcohol propoxylate and the freeze/thaw additive is polyethylene glycol having the number average molecular weight of about 200 g/mol (refer to Example 13), whereas conventional volatile freeze/thaw additives are ineffective (refer to Comparative Example 1).

Obviously, many modifications and variations of the present invention are possible in light of the above teachings, and the invention may be practiced otherwise than as specifically described within the scope of the appended claims.

What is claimed is:

1. A coating composition comprising:
   a latex component;
   an agent for replacing volatile coalescing solvent, said agent having the following formula:

$$X(AO)_nH$$

wherein
   X is a branched group based on $C_{10}$-Guerbet alcohol,
   AO is an alkyleneoxy group selected from the group of ethyleneoxy groups, 1,2-propyleneoxy groups, 1,2-butyleneoxy groups, and combinations thereof, and
   n is from 3 to 14;
   wherein said coating composition has a volatile organic compound content of less than or equal to 150 g/L, and
   wherein said coating composition is free of volatile coalescing solvents and volatile freeze/thaw additives having a volatility of greater than 10% as measured by Method 24.

2. A coating composition as set forth in claim 1 wherein n is from 3 to 5.

3. A coating composition as set forth in claim 2 wherein said agent has a HLB of from 1 to 9.

4. A coating composition as set forth in claim 3 wherein said agent is present in said coating composition in an amount of from about 0.15 to about 7.0 parts by weight based on 100 parts by weight of said coating composition.

5. A coating composition as set forth in claim 4 that exhibits low temperature coalescence at 40° F. over a period of 18 hours, exhibits blocking resistance in accordance with ASTM D4946-89, and has a wet scrub resistance of at least 400 cycles as measured in accordance with ASTM D2486.

6. A coating composition as set forth in claim 5 that exhibits freeze/thaw resistant in accordance with ASTM D2243-95.

7. A coating composition as set forth in claim 1 wherein said agent is present in said coating composition in an amount of from about 0.15 to about 7.0 parts by weight based on 100 parts by weight of said coating composition.

8. A coating composition as set forth in claim 7 that exhibits freeze/thaw resistance in accordance with ASTM D2243-95.

9. A coating composition as set forth in claim 1 wherein said agent comprises 2-propyl heptanol having about 10 mole of propylene oxide and about 1 mole of ethylene oxide.

10. A coating composition as set forth in claim 1 further comprising a low or non-volatile freeze/thaw additive having a volatility of less than or equal to 10% as measured by Method 24.

11. A coating composition as set forth in claim 10 wherein said low or non-volatile freeze/thaw additive comprises a polyethylene glycol having a molecular weight of at least 132 g/mol.

12. A coating composition as set forth in claim 11 wherein said agent comprises an alcohol propoxylate.

13. A coating composition as set forth in claim 11 wherein said low or non-volatile freeze/thaw additive is present in an amount of at least 0.1 parts by weight based on 100 parts by weight of said coating composition.

14. A coating composition as set forth in claim 13 that exhibits freeze/thaw resistance in accordance with ASTM D2243-95.

15. A coating composition as set forth in claim 10 wherein said freeze/thaw additive comprises a polypropylene glycol having a molecular weight of at least 200.

16. A coating composition as set forth in claim 15 wherein said low or non-volatile freeze/thaw additive is present in an amount of at least 0.4 parts by weight based on 100 parts by weight of said coating composition.

17. A coating composition as set forth in claim 16 that exhibits freeze/thaw resistance in accordance with ASTM D2243-95.

18. A coating composition as set forth in claim 1 further comprising an additive selected from the group of inorganic and organic pigments, dispersing agents, defoaming agents, wetting agents, adhesion promoters, viscosity modifiers, additives to improve hiding, additives to improve blocking, neutralizing agents, biocides, and combinations thereof.

19. A coating composition as set forth in claim 1 that exhibits low temperature coalescence at 40° F. over a period 18 hours, exhibits blocking resistance in accordance with ASTM D4946-89, and has a wet scrub resistance of at least 400 cycles as measured in accordance with ASTM D2486.

20. A coating composition as set forth in claim 19 that is free of freeze/thaw additives.

21. A coating composition as set forth in claim 1 that is free of freeze/thaw additives.

* * * * *